United States Patent
Xu et al.

(10) Patent No.: US 10,294,801 B2
(45) Date of Patent: May 21, 2019

(54) ROTOR BLADE HAVING ANTI-WEAR SURFACE

(71) Applicant: United Technologies Corporation, Farmington, CT (US)

(72) Inventors: JinQuan Xu, East Greenwich, RI (US); Glenn Levasseur, Colchester, CT (US); Gregory M. Dolansky, Higganum, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 134 days.

(21) Appl. No.: 15/659,360

(22) Filed: Jul. 25, 2017

(65) Prior Publication Data
US 2019/0032498 A1 Jan. 31, 2019

(51) Int. Cl.
*F01D 5/28* (2006.01)
*F04D 29/32* (2006.01)
(Continued)

(52) U.S. Cl.
CPC .............. *F01D 5/28* (2013.01); *F01D 5/143* (2013.01); *F01D 5/20* (2013.01); *F01D 5/225* (2013.01);
(Continued)

(58) Field of Classification Search
CPC . F01D 5/26; F01D 5/28; F04D 29/324; F02C 3/04; F05D 2220/32; F05D 2240/35; F05D 2300/50
See application file for complete search history.

(56) References Cited

U.S. PATENT DOCUMENTS 3,576,377 A * 4/1971 Beanland ................ F01D 5/225
416/190
4,986,737 A * 1/1991 Erdmann .............. B23P 15/006
416/190
(Continued)

FOREIGN PATENT DOCUMENTS

EP 1559871 A2 8/2005
EP 2578806 A2 4/2013

OTHER PUBLICATIONS

Extended European Search Report for European Application No. 18183751.9, completed Oct. 24, 2018.

*Primary Examiner* — Thomas N Moulis
(74) *Attorney, Agent, or Firm* — Carlson, Gaskey & Olds, P.C.

(57) ABSTRACT

A rotor blade includes a main body that extends radially outward from a first end to a second end, and includes a platform at the second end that extends circumferentially between opposing first and second sidewalls. The platform includes a first lateral wall that is situated between leading and trailing edges of the platform. The first lateral wall extends circumferentially between the first and second sidewalls and radially outward from the platform. The first lateral wall includes an extension that extends the first lateral wall circumferentially outward from the first sidewall. Respective portions of the first and second sidewalls adjacent to the first lateral wall reside in respective first and second planes, and the extension includes an outer face situated outside of the first and second planes. A majority of the first lateral wall includes a first material, and the outer face includes a second material having a different resistance to wear than the first material.

20 Claims, 8 Drawing Sheets

(51) Int. Cl.
  *F01D 5/14*   (2006.01)
  *F01D 5/20*   (2006.01)
  *F01D 5/22*   (2006.01)
  *F01D 11/08*  (2006.01)
  *F02C 3/04*   (2006.01)

(52) U.S. Cl.
  CPC ............ *F01D 11/08* (2013.01); *F04D 29/324* (2013.01); *F02C 3/04* (2013.01); *F05D 2220/32* (2013.01); *F05D 2240/35* (2013.01); *F05D 2240/80* (2013.01); *F05D 2300/50* (2013.01)

(56) References Cited

U.S. PATENT DOCUMENTS

| | | | | |
|---|---|---|---|---|
| 6,164,916 | A * | 12/2000 | Frost | B23K 35/3046 148/528 |
| 6,491,498 | B1 | 12/2002 | Seleski et al. | |
| 8,573,925 | B2 * | 11/2013 | Townes | F01D 5/225 415/115 |
| 8,894,368 | B2 | 11/2014 | Jones | |
| 2004/0124231 | A1 * | 7/2004 | Hasz | B23K 35/3046 228/245 |
| 2005/0079058 | A1 * | 4/2005 | Paquet | F01D 5/225 416/191 |
| 2007/0154338 | A1 * | 7/2007 | Sathian | B23K 1/0018 419/5 |
| 2011/0243714 | A1 * | 10/2011 | Saxer | F01D 5/20 415/173.1 |
| 2012/0082559 | A1 * | 4/2012 | Guglielmin | B82Y 30/00 416/241 R |
| 2013/0084167 | A1 * | 4/2013 | Hewitt | F01D 5/288 415/173.1 |
| 2013/0101395 | A1 * | 4/2013 | Miller | F01D 5/16 415/119 |
| 2014/0234110 | A1 | 8/2014 | Puram et al. | |
| 2014/0271142 | A1 * | 9/2014 | Albers | F01D 11/005 415/173.1 |
| 2015/0023793 | A1 * | 1/2015 | Bensalah | F01D 5/225 416/193 A |
| 2015/0110634 | A1 * | 4/2015 | Jevons | F01D 5/3007 416/220 R |
| 2016/0258046 | A1 * | 9/2016 | Uihlein | F04D 29/28 |
| 2016/0298231 | A1 * | 10/2016 | Trzcinski | C23C 10/10 |
| 2016/0333889 | A1 * | 11/2016 | Kray | F01D 5/282 |
| 2017/0268350 | A1 * | 9/2017 | Tabata | C23C 4/06 |
| 2017/0284218 | A1 * | 10/2017 | Kondo | F02C 7/28 |
| 2018/0345396 | A1 * | 12/2018 | Kottilingam | B23K 1/0018 |
| 2018/0347380 | A1 * | 12/2018 | Patel | F01D 5/225 |
| 2018/0363476 | A1 * | 12/2018 | Hafner | F01D 5/288 |
| 2019/0010811 | A1 * | 1/2019 | Jones | F01D 5/286 |

* cited by examiner

ROTOR BLADE HAVING ANTI-WEAR SURFACE

BACKGROUND

This application relates to rotor blades, and more particularly to rotor blades having an anti-wear surface material.

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor. The fan rotor, turbine rotors, and compressor rotors have a plurality of rotor blades that extend radially outward from a hub.

Rotors blades extend radially outward from a hub and are circumferentially spaced apart from one other around the hub. A radially outward end of a rotor blade may have a platform, and platforms of neighboring rotor blades may contact each other during engine operation.

SUMMARY

A rotor blade according to an example of the present disclosure includes a main body that extends radially outward from a first end to a second end, and a platform at the second end, the platform extending circumferentially between two opposing first and second sidewalls. The platform includes a first lateral wall that is situated between leading and trailing edges of the platform, the first lateral wall extending circumferentially between the first and second sidewalls and radially outward from the platform. The first lateral wall includes an extension that extends the first lateral wall circumferentially outward from the first sidewall, with respective portions of the first and second sidewalls adjacent to the first lateral wall residing in respective first and second planes. The extension includes an outer face situated outside of the first and second planes. A majority of the first lateral wall includes a first material, and the outer face includes a second material having a different resistance to wear than the first material.

In a further embodiment of any of the foregoing embodiments, the second material has a greater resistance to wear than the first material.

In a further embodiment of any of the foregoing embodiments, the outer face is situated in a third plane that is spaced apart from the first and second planes, and at least one fillet surrounds the outer face where the outer face meets the first sidewall, the at least one fillet providing a transition between the first sidewall and the outer face.

In a further embodiment of any of the foregoing embodiments, the platform includes an additional, second lateral wall that is also situated between the leading and trailing edges of the platform. The second lateral wall extends circumferentially between the first and second sidewalls and radially outward from the platform, and includes an additional extension that extends the second lateral wall circumferentially outward from the first or second sidewall. The additional extension includes an additional outer face situated outside of the first and second planes, the additional outer face also including the second material.

In a further embodiment of any of the foregoing embodiments, the extension includes a wall having a substantially v-shaped profile, wherein the v-shaped profile is provided by radially inner and outer portions that extend away from the first sidewall.

In a further embodiment of any of the foregoing embodiments, the extension includes a rounded wall.

In a further embodiment of any of the foregoing embodiments, the first lateral wall has a recess that extends into the first lateral wall from the second plane, and the recess is sized to receive an extension from a lateral wall of an adjacent rotor blade.

In a further embodiment of any of the foregoing embodiments, the recess is sized to maintain a relief gap radially inward or radially outward of the extension of the adjacent rotor blade that is received into the recess.

In a further embodiment of any of the foregoing embodiments, the recess is sized to maintain a relief gap circumferentially between the recess and the extension that is received into the recess.

In a further embodiment of any of the foregoing embodiments, the extension is welded onto the first lateral wall.

In a further embodiment of any of the foregoing embodiments, the second material includes a coating applied to the extension.

A gas turbine engine according to an example of the present disclosure includes a compressor, a turbine that drives the compressor, and a combustor operable to ignite a mixture of fuel and compressed air from the compressor. The compressor and a turbine each have a plurality of rotor blades extending radially outward from a hub, and the rotor blades of at least one of the compressor and the turbine include a main body that extends radially outward from a first end to a second end, and a platform at the second end. The platform extends circumferentially between two opposing first and second sidewalls, and includes a first lateral wall that is situated between leading and trailing edges of the platform. The first lateral wall extends circumferentially between the first and second sidewalls and radially outward from the platform. The first lateral wall includes an extension that extends the first lateral wall circumferentially outward from the first sidewall, respective portions of the first and second sidewalls adjacent to the first lateral wall residing in respective first and second planes. The extension includes an outer face situated outside of the first and second planes. A majority of the first lateral wall includes a first material, and the outer face includes a second material having a different resistance to wear than the first material.

In a further embodiment of any of the foregoing embodiments, the second material has a greater resistance to wear than the first material.

In a further embodiment of any of the foregoing embodiments, the outer face is situated in a third plane that is spaced apart from the first and second planes, at least one fillet surrounds the outer face where the outer face meets the first sidewall, and the at least one fillet provides a transition between the first sidewall and the outer face.

In a further embodiment of any of the foregoing embodiments, the platform includes an additional, second lateral wall that is also situated between the leading and trailing edges of the platform, the second lateral wall extending circumferentially between the first and second sidewalls and radially outward from the platform. The second lateral wall includes an additional extension that extends the second lateral wall circumferentially outward from the first or second sidewall, the additional extension including an additional outer face situated outside of the first and second planes, the additional outer face also including the second material.

In a further embodiment of any of the foregoing embodiments, the extension includes a wall having a substantially v-shaped profile, wherein the v-shaped profile is provided by radially inner and outer portions that extend away from the first sidewall.

In a further embodiment of any of the foregoing embodiments, the extension includes a rounded wall.

In a further embodiment of any of the foregoing embodiments, the first lateral wall includes a recess that extends into the first lateral wall from the second plane, wherein the recess is sized to receive an extension from a lateral wall of an adjacent rotor blade.

In a further embodiment of any of the foregoing embodiments, the recess is sized to maintain a relief gap radially inward or radially outward of the extension of the adjacent rotor blade that is received into the recess.

In a further embodiment of any of the foregoing embodiments, the recess is sized to maintain a relief gap circumferentially between the recess and the extension that is received into the recess.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

One of ordinary skill in the art will appreciate that in the drawings, certain aspects are exaggerated for the purposes of illustration.

DETAILED DESCRIPTION

Figure 1:
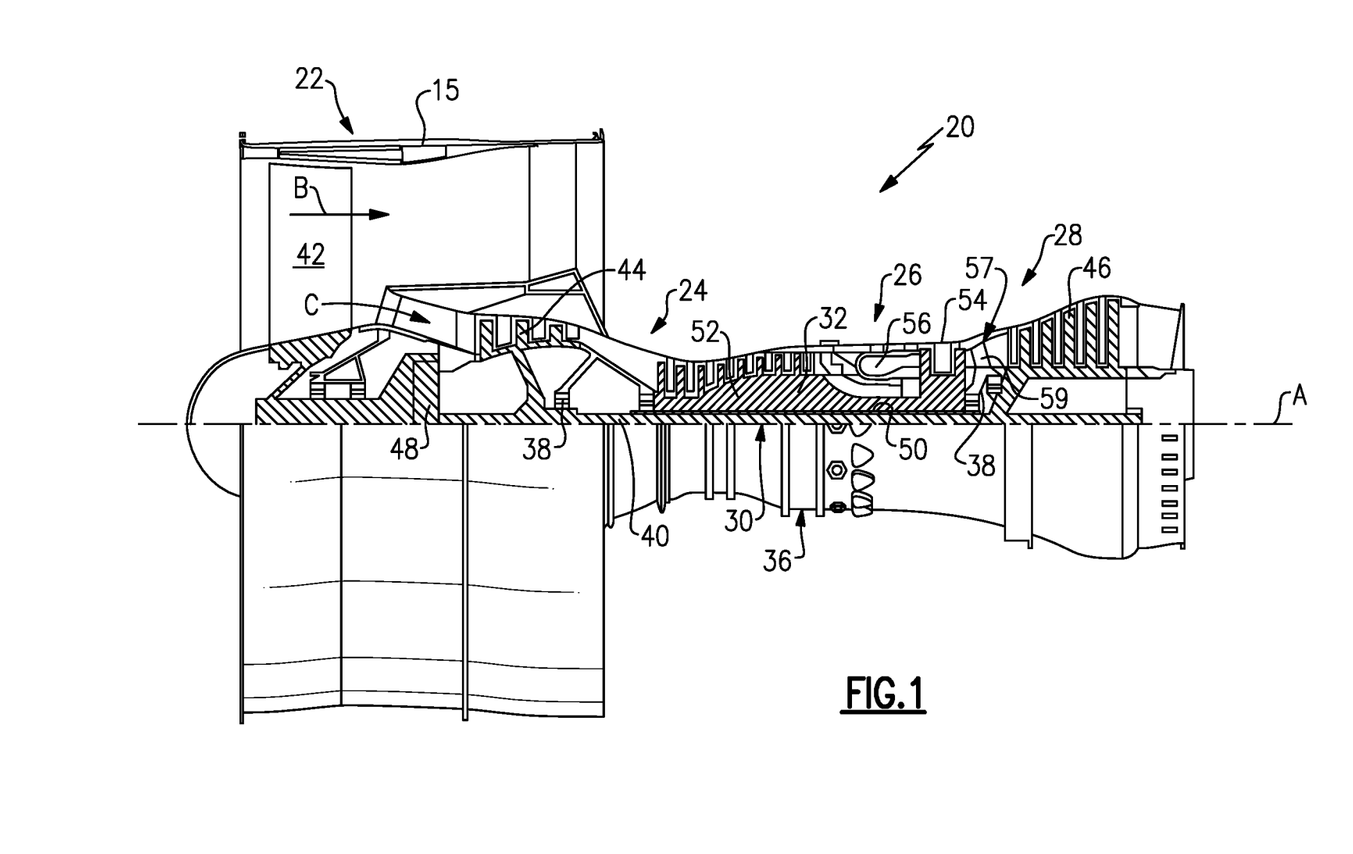
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including single-spool or three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption - also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7° R)]$^{0.5}$. The "Low corrected fan tip speed" as disclosed herein according to one non-limiting embodiment is less than about 1150 ft/second (350.5 meters/second).

Figure 2:
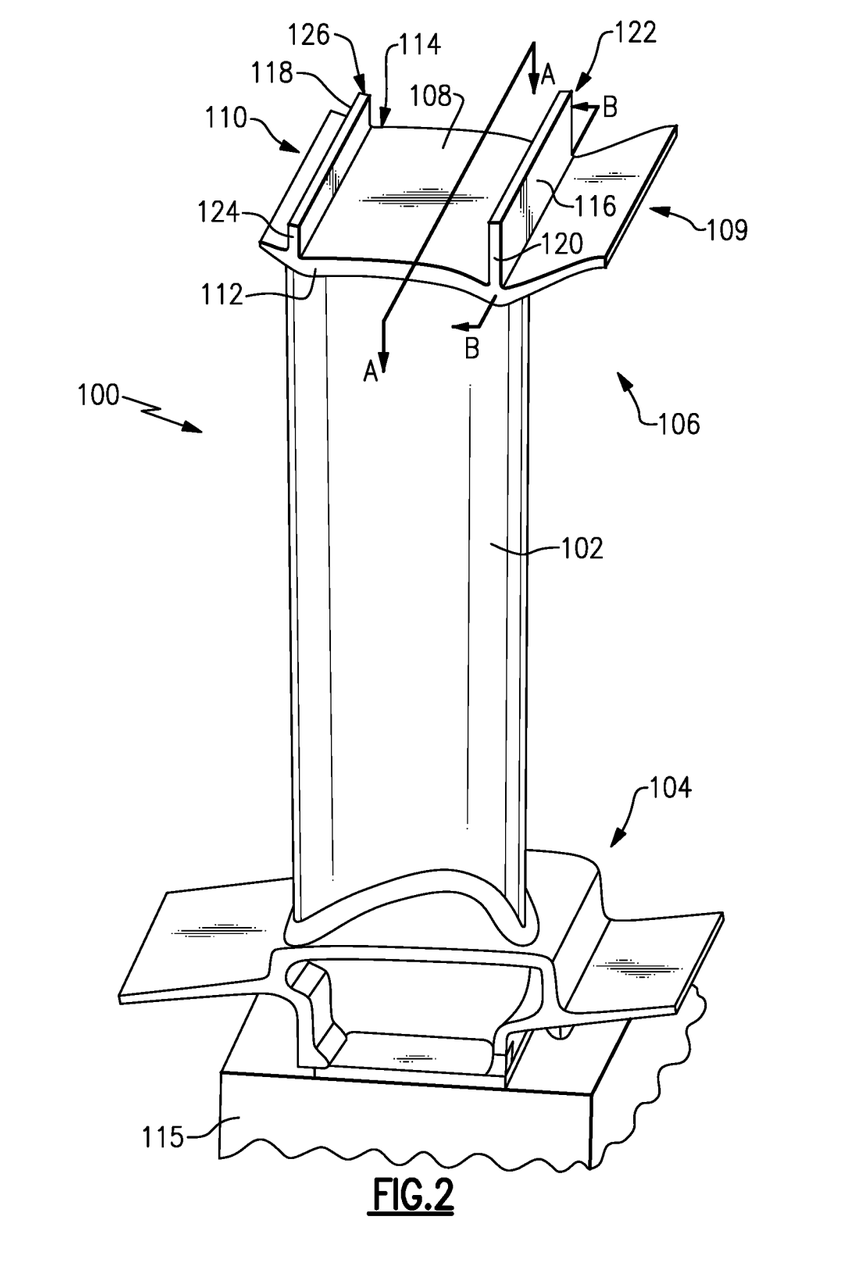
FIG. 2 is a view of an example rotor blade that includes an outer platform.

FIG. 2 is a view of an example rotor blade 100 having a main body 102 that is an airfoil and that extends radially outward from a first end 104 to an opposite second end 106. The rotor blade 100 may be incorporated into the low pressure turbine 46, the high pressure turbine 54, the low pressure compressor 44, the high pressure compressor 52, and/or fan section 22 of the gas turbine engine 20, for example. In another example, the rotor blade 100 is incorporated into an intermediate pressure turbine for a three-spool engine. A platform 108 is situated radially outside the second end 106. The platform 108 extends axially between a leading edge 109 and a trailing edge 110, and circumferentially between opposing first and second sidewalls 112, 114. As used in this disclosure, the terms "radially" and "circumferentially" are used with reference to the engine central longitudinal axis A and are used for purposes of explanation only.

The platform 108 includes at least one lateral wall that extends between the sidewalls 112, 114. In the example of FIG. 2, there are two lateral walls, including a first lateral wall 116 and a second lateral wall 118 that is aft of the first lateral wall 116. However, it is understood that other quantities of lateral walls could be used (e.g., one or more than two). The lateral walls 116, 118 extend circumferentially between the sidewalls 112, 114, and extend radially outward from the platform 108. When a plurality of the rotor blades 100 are secured to a hub (schematically shown as 115), the lateral walls 116, 118 are arranged to form circumferentially segmented rings around the central longitudinal axis A (even if spaced apart from each other slightly).

The lateral walls 116, 118 provide seals that help prevent air leaks from air flowing past the rotor blades 100. Lateral wall 116 includes opposing end faces 120, 122, and lateral wall 118 includes opposing end faces 124, 126. The lateral walls 116, 118 may extend radially outward in a direction perpendicular to the central longitudinal axis A, or may be inclined at an acute angle with respect to the axis A, for example.

Figure 3:
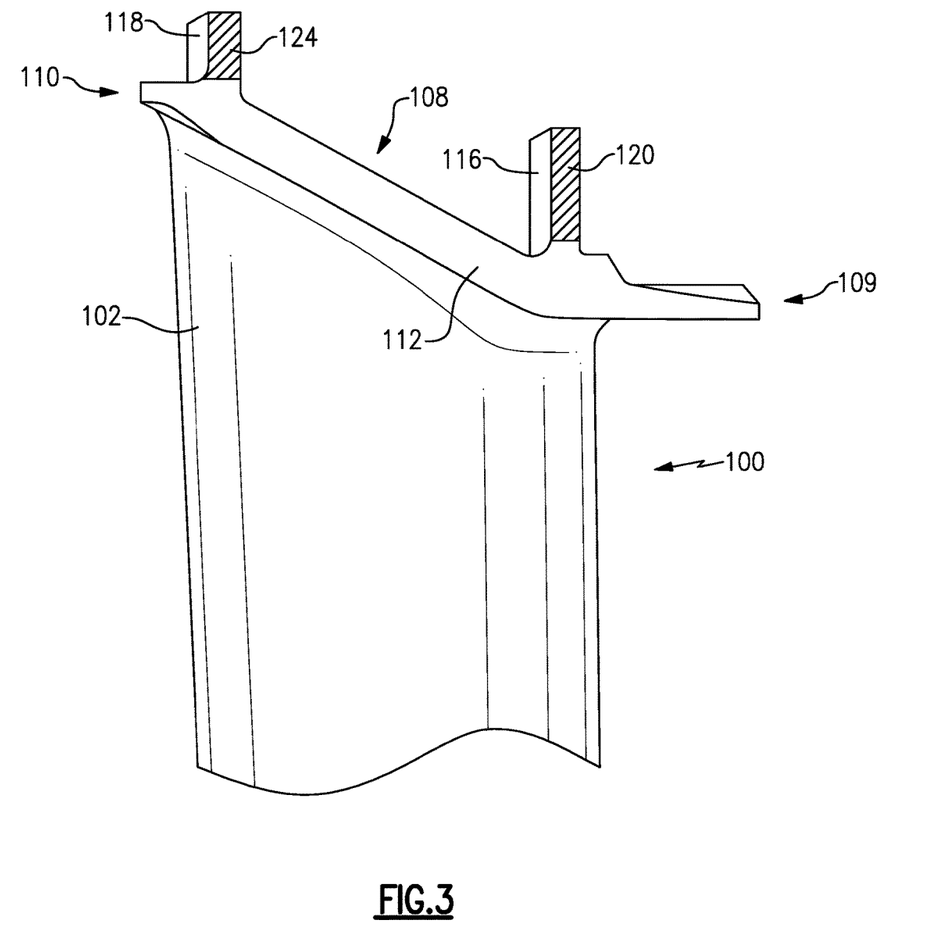
FIG. 3 is another view of a rotor blade.

FIG. 3 is a side view of the platform 108 of the example rotor blade 100 of FIG. 2, which depicts the lateral walls 116, 118 and their end faces 120, 124, and the leading and trailing edges 109, 110.

Figure 4:
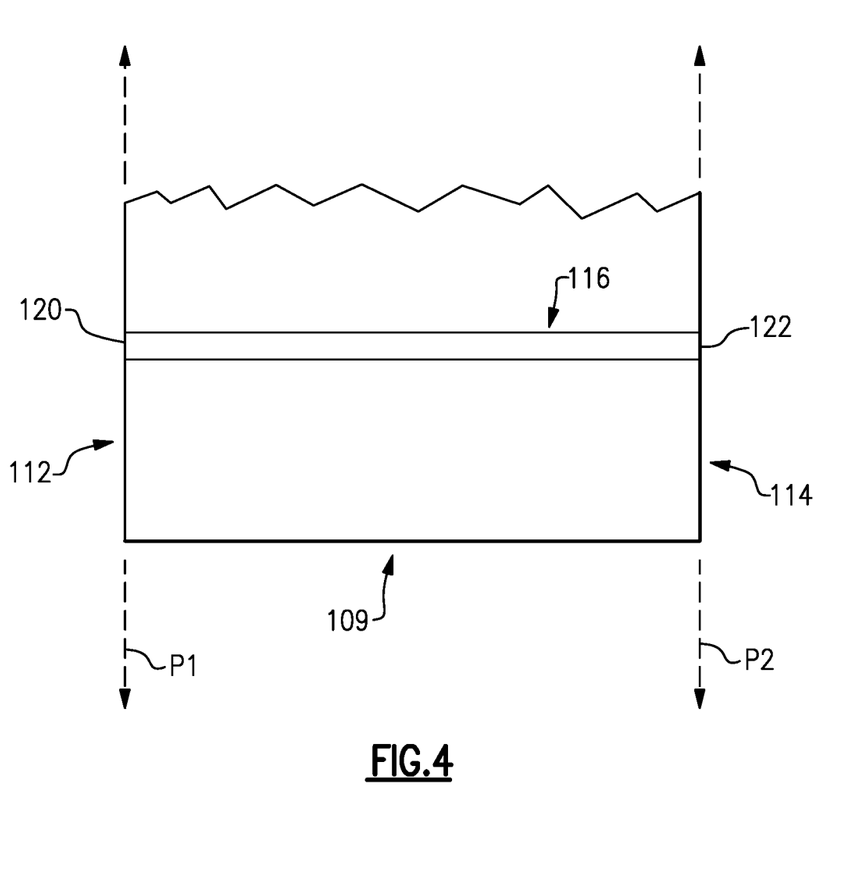
FIG. 4 is a schematic view of the outer platform of a rotor blade.

FIG. 4 is a schematic top view of the platform 108, taken along line A-A of FIG. 2. At least a portion of the first sidewall 112 resides in a first plane P1, and at least a portion of the second sidewall 114 resides in a second plane P2 (e.g., a portion adjacent to the lateral wall 116 and/or a portion adjacent to lateral wall 118). In some non-limiting examples, the planes P1, P2 are perpendicular to the leading and trailing edges 109, 110. In other examples, P1 and/or P2 is non-perpendicular to the leading edge 109 and/or trailing edge 110. In some examples, portions of the sidewalls 112, 114 in between the lateral walls 116, 118 are shaped to interfit with the sidewalls of adjacent rotor blades. For example, the sidewalls 112, 114 may have a zig-zagged profile to facilitate the interfitting.

A majority of the lateral wall 112 and/or lateral wall 114 is formed of a first material. The first material may include a metal, for example. Although not shown in FIG. 4, a portion of at least one of the end faces 120-126 is situated outside of the first and second planes P1, P2, and has an outer surface formed of a second material that is different from the first material, and in particular has a different chemical composition from the first material. The second material is an anti-wear material that has a greater resistance to wear than the first material, and provides an increased wear resistance relative to a remainder of the rotor blade 100.

In one example, the second material is cobalt or a cobalt-based alloy. The anti-wear material provides an inter-blade contact surface, and minimizes wear between platforms 108 of adjacent rotor blades 100. The portion may include an extension from and/or a recess into one of the end faces 120-126, for example. In one example, the portion includes one or more of the cross-hatched areas in FIG. 3, on one or both of the sidewalls 112, 114.

Figure 5A:
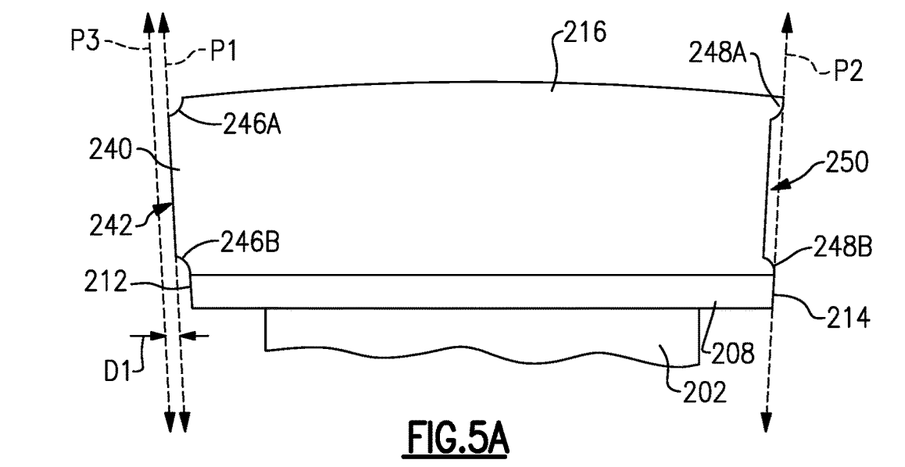
FIGS. 5A-E are schematic views of an example lateral wall for an outer platform of a rotor blade.

FIGS. 5A-D are schematic views of an example lateral wall 216 of platform 208 of airfoil 202, where like reference numerals designate like elements (e.g., lateral walls 216, 218 are representative of the detail of example walls 116, 118). FIG. 5A is taken along line B-B of FIG. 2. As shown in FIG. 5A, the lateral wall 216 includes an extension 240 that extends the lateral wall 216 circumferentially outward from the sidewall 212 and beyond the plane P1. The extension 240 includes an outer face 242 situated in plane P3 that is spaced apart from the planes P1, P2. In the non-limiting example of FIG. 5A, the plane P3 is parallel to the plane P1. In other examples though, P3 is non-parallel to P1. One or more fillet portions 246 surround the outer face 242 where the outer face 242 meets the first sidewall 212. The one or more fillet portions 246 provide a transition between the outer face 242 and the first sidewall 212, and extend to the first sidewall 212.

The one or more fillet portions 246 may include a single, continuous fillet 246 that provides a perimeter around the entire outer face 242, or may comprise one or more discrete fillets 246. In the example of FIG. 5A, a radially outer fillet portion 246A and a radially inner fillet portion 246B are shown. The fillets portions 246 are concave when viewed from a location exterior to the lateral wall 216. A distance D1 between the planes P1, P3 in one example is 0.01-0.2 inches (0.254-0.508 mm). In a further example, the distance D1 is 0.03-0.1 inches (0.762-2.54 mm). In a further example, the distance D1 is approximately 0.05 inches (1.27 mm). It is also understood to one skilled in the art that the distance D1 could be varied to accommodate the needs of other applications.

On an opposite end of the lateral wall 216, a recess 250 is formed that is sized to receive the extension 240 of an adjacent rotor blade. For the purposes of this application, stating that a recess is "sized to receive" an extension means that the recess is of the same basic shape as the extension, although perhaps slightly larger.

The recess 250 is defined in part by bumps 248A-B that extend towards the fillets portions 246A-B when an extension 240 of an axially aligned, circumferentially adjacent rotor blade is received into the recess 250. The bumps 248 are convex when viewed from a location exterior to the lateral wall 216. In one example, the bumps 248 are part of a rim that surrounds an entire perimeter of the extension 240 received into the recess 250. Although extension 240 and recess 250 are both depicted in the example of FIG. 5A, in one example the lateral wall 216 only includes one of the extension 240 and recess 250 (e.g., a rotor blade 100 that includes two extensions, one on each of wall 212, 214 or a rotor blade 100 that includes two recesses, one for each of wall 212, 214).

Figure 5B:
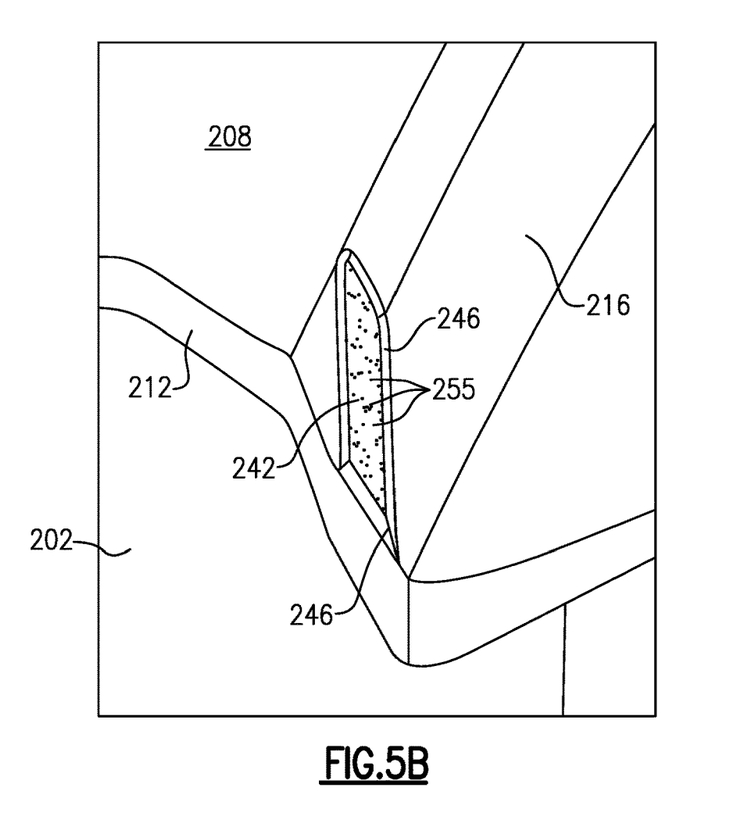

Anti-wear material 255 is shown on the outer face 242 in FIG. 5B. Although not shown in FIGS. 5A-B, the anti-wear material 255 may also be provided within the recess 250 in some examples.

Figure 5C:
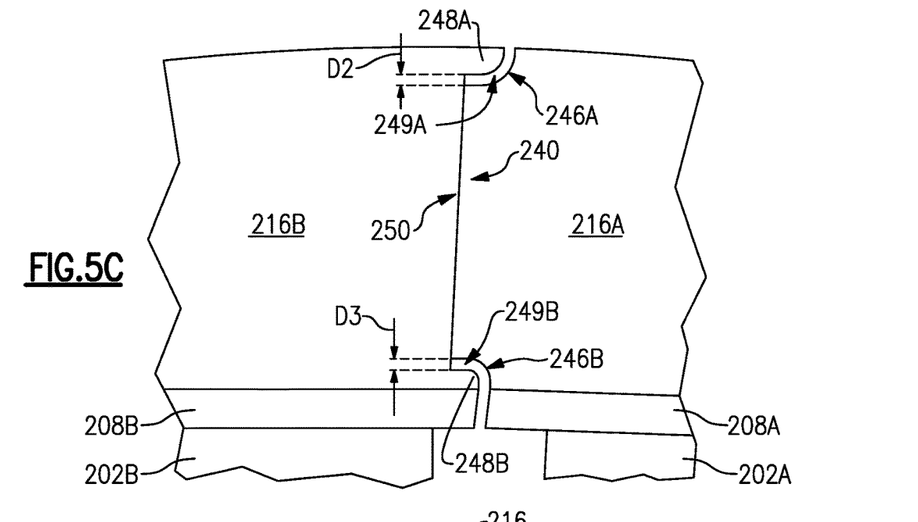

FIG. 5C schematically shows the extension 240 of a lateral wall 216A being received into the recess 250 of an adjacent lateral wall 216B of adjacent platforms 208A, 208B of adjacent airfoils 202A, 202B. It should be understood that the adjacent lateral wall 216B may be provided on a rotor blade arranged substantially the same as the rotor blade 100 described relative to FIG. 2. As shown in FIG. 5C, the bumps 248 extend towards the fillets 246 when an adjacent extension 240 is received into the recess 250. In the particular example of FIG. 5C, a relief gap 249A having a distance D2 is formed between the radially outer bump 248A and fillet portion 246A, and a relief gap 249B having a distance D3 is formed between the radially inner bump 248B and fillet portion 246B. In other examples, one or both of the relief gaps 249A-B are omitted. In some examples, a relief gap is maintained circumferentially between the recess 250 and the extension 240 that is received into the recess.

The relief gaps 249A-B permit differing thermal expansion of the adjacent rotor blades, and may help prevent a lockup condition between two adjacent rotor blade platforms that may otherwise occur from such thermal expansion. In one example, the distance D2 and/or D3 is 0.001-0.050 inches (0.0254-1.27 mm). In a further example, the distance D2 and/or D3 is 0.001-0.035 inches (0.0254-0.889 mm). It is also understood to one skilled in the art that the distances D1, D2 could be varied to accommodate the needs of other applications.

In one example, the anti-wear material 255 is part of a coating. In another example, shown in FIG. 5D, a portion (e.g., a majority) of the extension 240 is composed of the anti-wear material, and the extension 240 may be welded onto the end 252 of lateral wall 216 using one or more welds 260. In one example, a weld 260 is machined or cut away to form the fillet portions 246.

Figure 5D:
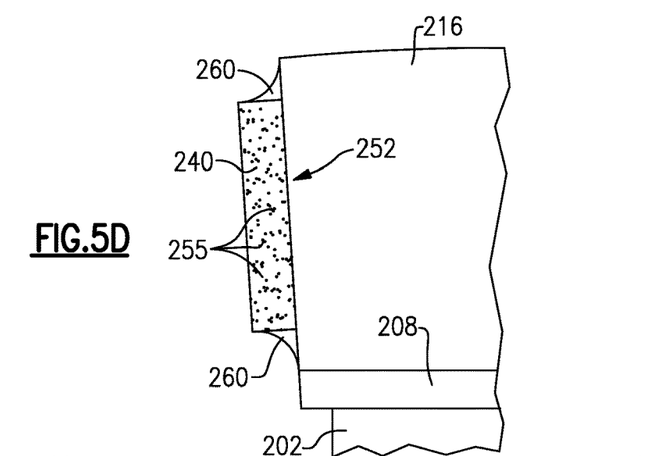
Figure 5E:
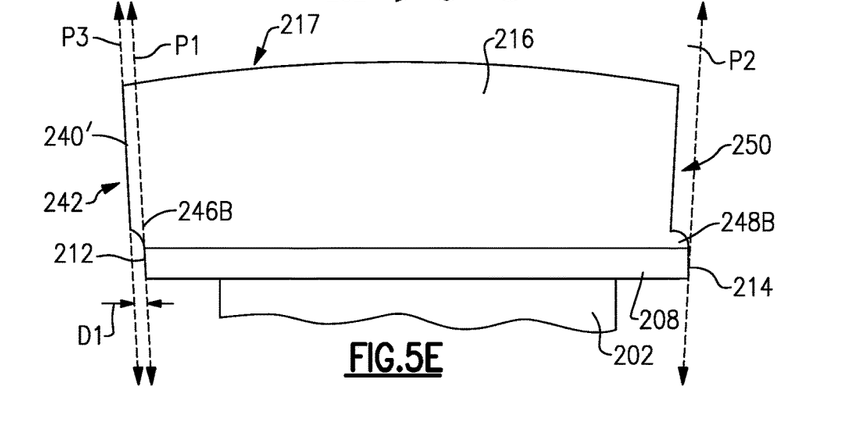

Although FIGS. 5A, 5C, and 5D show fillet 246A and fillet 246B, it is understood that in some examples fillet 246A or fillet 246B is omitted. FIG. 5E depicts one particular example that omits fillet 246A and bump 248A. In this example, the extension 240' is flush with a radially outer surface 217 of lateral wall 216.

Figure 6A:
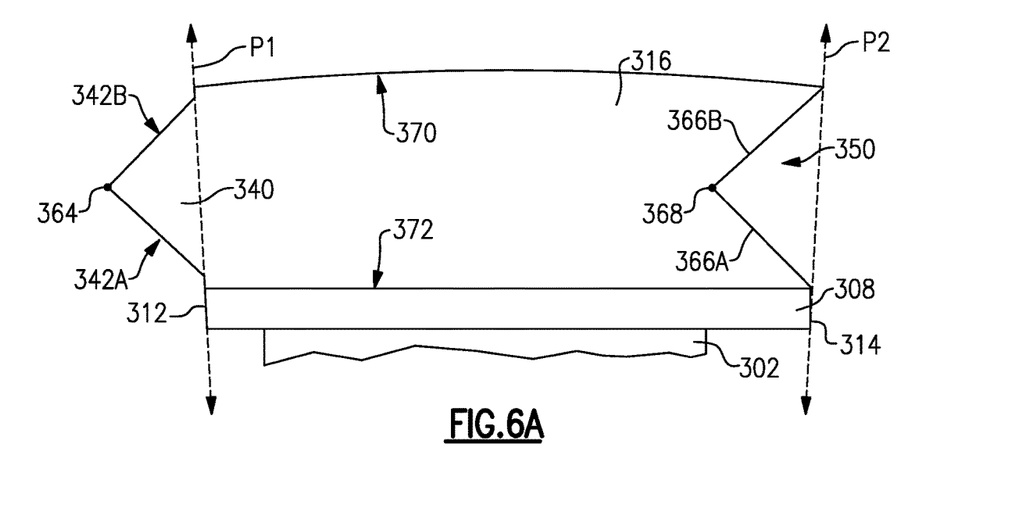
FIGS. 6A-B are schematic views of another example lateral wall for an outer platform of a rotor blade.
Figure 6B:
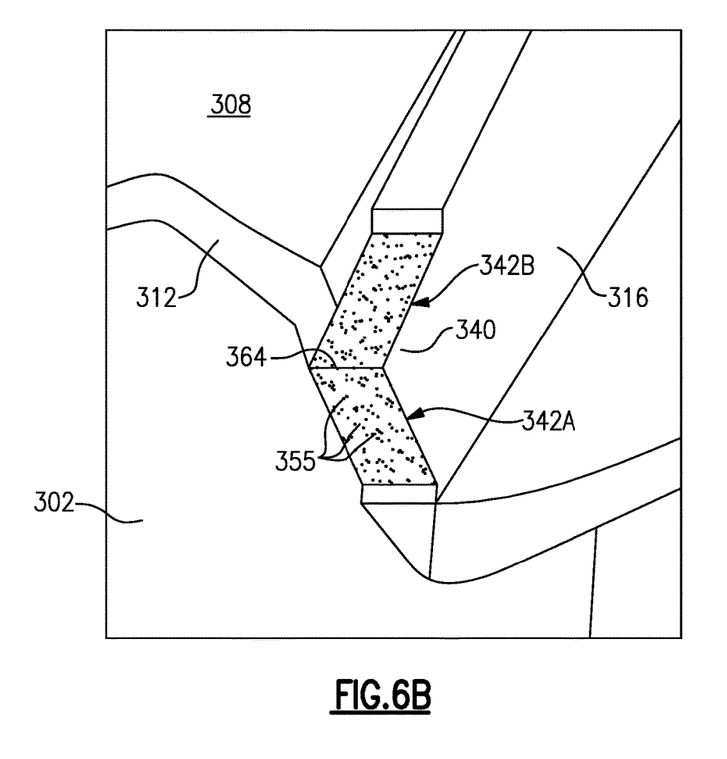

FIGS. 6A-B are schematic views of another example lateral wall 316, where like reference numerals designate like elements (e.g., the lateral wall 316 is representative of the detail of an example lateral wall 116). FIG. 6A is taken along line B-B of FIG. 2. As shown in FIG. 6A, the lateral wall 316 includes an extension 340 having a substantially v-shaped profile when viewed along the engine central longitudinal axis A, for example. The extension 340 extends the lateral wall 316 circumferentially outward from the sidewall 312 of platform 308 of airfoil 302 and beyond the plane P1. The extension 340 has an outer face that includes radially inner portion 342A and a radially outer portion 342B. The portions 342A-B may be planar in this example and extend toward one another away from the first sidewall 312 and plane P1, and converge at an apex 364.

On an opposite end of the lateral wall 316, a substantially v-shaped recess 350 is formed that is sized to receive the extension 340 of an adjacent rotor blade. The recess 350 also includes an inner face having a radially inner portion 366A and a radially outer portion 366B that extend toward each other into the sidewall 314, and converge at an apex 368. The apexes 364, 368 are in one example equidistant from a top 370 and a bottom 372 of the lateral wall 316. The apexes 364, 368 are rounded in some examples. Anti-wear material 355 is shown on the outer face portions 342A-B in FIG. 6B. Although not shown in FIGS. 6A-B, the anti-wear material 355 may also be provided on the portions 366A-B within the recess 350 in some examples. Although extension 340 and recess 350 are both depicted in the example of FIG. 6A, in one example the lateral wall 316 only includes one of the extension 340 and recess 350 (e.g., a rotor blade 100 that includes two extensions, one on each of wall 312, 314 or a rotor blade 100 that includes two recesses, one for each of wall 312, 314). In some examples, when the extension 340 is received into the recess 350 of an adjacent rotor blade, a relief gap is formed between portion 342A and 366A and/or between portion 342B and portion 366B (e.g., a radial and/or circumferential relief gap). The relief gap is 0.001-0.050 inches (0.0254-1.27 mm) in one example, and is 0.001-0.035 inches (0.0254-0.889 mm) in a further example. It is also understood to one skilled in the art that the size of the relief gap could be varied to accommodate the needs of other applications.

Figure 7A:
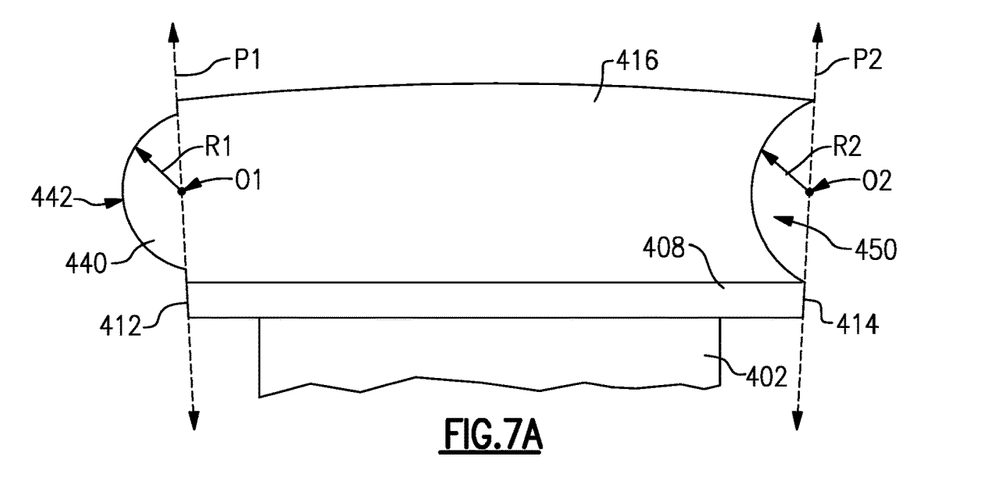
FIGS. 7A-B are schematic views of another example lateral wall for an outer platform of a rotor blade.
Figure 7B:
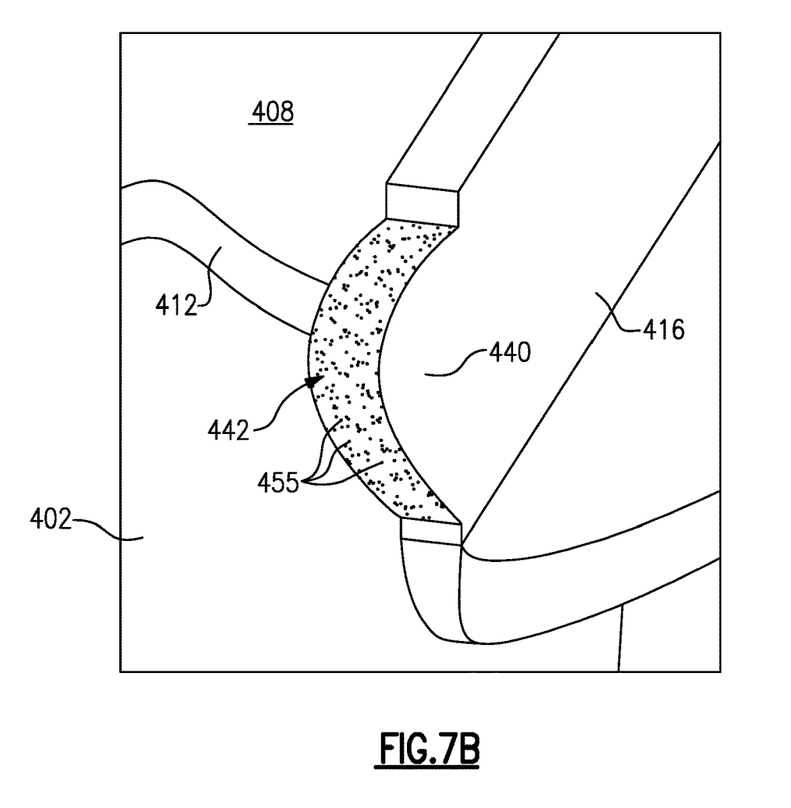

FIGS. 7A-B are schematic views of another example lateral wall 416, where like reference numerals designate like elements (e.g., the lateral wall 416 is representative of the detail of an example lateral wall 116). FIG. 7A is taken along line B-B of FIG. 2. As shown in FIG. 7A, the lateral wall 416 includes an extension 440 that extends the lateral wall 416 circumferentially outward from the first sidewall 412 of platform 408 of airfoil 402 and beyond the plane P1. The extension 440 has an outer face 442 having a curved profile that may be rounded and follows a radius R1 having an origin O1 in the plane P1. The radius R1 is constant in some examples, and variable in other examples.

On an opposite end of the lateral wall 416, a rounded recess 450 is formed that is sized to receive the extension 440 of an adjacent rotor blade. The rounded recess 450 may have a radius R2 that follows a point of origin O2 in the plane P2. The radius R2 is constant in some examples, and variable in other examples. In one example, radius R1 and radius R2 are the same for the extension 440 and recess 450. Anti-wear material 455 is shown on outer face 442 in FIG. 7B. Although not shown in FIGS. 7A-B, the anti-wear material 455 may also be provided within the recess 450 in some examples. Although extension 440 and recess 450 are both depicted in the example of FIG. 5A, in one example the lateral wall 416 only includes one of the extension 440 and recess 450 (e.g., a rotor blade 100 that includes two extensions, one on each of wall 412, 414 or a rotor blade 100 that includes two recesses, one for each of wall 412, 414). In some examples, when the extension 440 is received into the recess 450 of an adjacent rotor blade, a relief gap is formed between the extension 440 and recess 450 (e.g., a radial and/or circumferential relief gap). The relief gap is 0.001-0.050 inches (0.0254-1.27 mm) in one example, and 0.001-0.035 inches (0.0254-0.889 mm) in a further example. It is also understood to one skilled in the art that the size of the relief gap could be varied to accommodate the needs of other applications.

Although various extensions and recesses have been discussed above, including a substantially v-shaped indentation and recess, and a rounded profile and recess, it is understood that these are only examples, and other shapes are contemplated.

In one example, the anti-wear material 255, 355, 455 is part of a coating. In another example (e.g., FIG. 5D), a majority of the extensions 240, 340, 440 are composed of the anti-wear material, and those extensions are welded onto one of the sidewalls 212/312/412 or 214/314/414. If such welding resulted in any overwelding, the excess could be cut away (e.g., to form fillet portions).

Although the extensions 240, 340, 440 have been discussed in the context of extending from sidewall 212/312/412 and from lateral wall 216/316/416, it is understood that similar extensions could alternatively or additionally extend from sidewall 214/314/414 and/or from lateral wall 218/318/418. Also, it is understood that in some examples the portion of the platform 208/308/408 that includes the anti-wear material may only include recess 250, 350, 450 and not extension 240, 340, 440.

Also, although rotor blade 100 has been largely discussed in the context of a gas turbine engine for an aircraft, the rotor blade 100 could be applicable to non-aerospace engines such as industrial gas turbines or marine engines.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A rotor blade comprising:
    a main body that extends radially outward from a first end to a second end; and
    a platform at the second end, the platform extending circumferentially between two opposing first and second sidewalls, the platform comprising a first lateral wall that is situated between leading and trailing edges of the platform, the first lateral wall extending circumferentially between the first and second sidewalls and radially outward from the platform, the first lateral wall including an extension that extends the first lateral wall circumferentially outward from the first sidewall, respective portions of the first and second sidewalls adjacent to the first lateral wall residing in respective first and second planes, the extension comprising an outer face situated outside of the first and second planes, a majority of the first lateral wall comprising a first material, the outer face comprising a second material having a different resistance to wear than the first material.

2. The rotor blade of claim 1, wherein the second material has a greater resistance to wear than the first material.

3. The rotor blade of claim 1, wherein the outer face is situated in a third plane that is spaced apart from the first and second planes, and wherein at least one fillet surrounds the outer face where the outer face meets the first sidewall, the at least one fillet providing a transition between the first sidewall and the outer face.

4. The rotor blade of claim 1, wherein the platform comprises an additional, second lateral wall that is also situated between the leading and trailing edges of the platform, the second lateral wall extending circumferentially between the first and second sidewalls and radially outward from the platform, the second lateral wall including an additional extension that extends the second lateral wall circumferentially outward from the first or second sidewall, the additional extension comprising an additional outer face situated outside of the first and second planes, the additional outer face also comprising the second material.

5. The rotor blade of claim 1, wherein the extension comprises a wall having a substantially v-shaped profile, wherein the v-shaped profile is provided by radially inner and outer portions that extend away from the first sidewall.

6. The rotor blade of claim 1, wherein the extension comprises a rounded wall.

7. The rotor blade of claim 1, wherein the first lateral wall has a recess that extends into the first lateral wall from the second plane, wherein the recess is sized to receive an extension from a lateral wall of an adjacent rotor blade.

8. The rotor blade of claim 7, wherein the recess is sized to maintain a relief gap radially inward or radially outward of the extension of the adjacent rotor blade that is received into the recess.

9. The rotor blade of claim 7, wherein the recess is sized to maintain a relief gap circumferentially between the recess and the extension that is received into the recess.

10. The rotor blade of claim 1, wherein the extension is welded onto the first lateral wall.

11. The rotor blade of claim 1, wherein the second material comprises a coating applied to the extension.

12. A gas turbine engine comprising:
    a compressor;
    a turbine that drives the compressor; and
    a combustor operable to ignite a mixture of fuel and compressed air from the compressor;
    wherein the compressor and a turbine each comprise a plurality of rotor blades extending radially outward from a hub, and wherein the rotor blades of at least one of the compressor and the turbine comprise:
        a main body that extends radially outward from a first end to a second end; and
        a platform at the second end, the platform extending circumferentially between two opposing first and second sidewalls, the platform comprising a first lateral wall that is situated between leading and trailing edges of the platform, the first lateral wall extending circumferentially between the first and second sidewalls and radially outward from the platform, the first lateral wall including an extension that extends the first lateral wall circumferentially outward from the first sidewall, respective portions of the first and second sidewalls adjacent to the first lateral wall residing in respective first and second planes, the extension comprising an outer face situated outside of the first and second planes, a majority of the first lateral wall comprising a first material, the outer face comprising a second material having a different resistance to wear than the first material.

13. The gas turbine engine of claim 12, wherein the second material has a greater resistance to wear than the first material.

14. The gas turbine engine of claim 12, wherein the outer face is situated in a third plane that is spaced apart from the first and second planes, and wherein at least one fillet surrounds the outer face where the outer face meets the first sidewall, the at least one fillet providing a transition between the first sidewall and the outer face.

15. The gas turbine engine of claim 12, wherein the platform comprises an additional, second lateral wall that is also situated between the leading and trailing edges of the platform, the second lateral wall extending circumferentially between the first and second sidewalls and radially outward from the platform, the second lateral wall including an additional extension that extends the second lateral wall circumferentially outward from the first or second sidewall, the additional extension comprising an additional outer face situated outside of the first and second planes, the additional outer face also comprising the second material.

16. The gas turbine engine of claim 12, wherein the extension comprises a wall having a substantially v-shaped profile, wherein the v-shaped profile is provided by radially inner and outer portions that extend away from the first sidewall.

17. The gas turbine engine of claim 12, wherein the extension comprises a rounded wall.

18. The gas turbine engine of claim 12, wherein the first lateral wall comprises a recess that extends into the first lateral wall from the second plane, wherein the recess is sized to receive an extension from a lateral wall of an adjacent rotor blade.

19. The gas turbine engine of claim 18, wherein the recess is sized to maintain a relief gap radially inward or radially outward of the extension of the adjacent rotor blade that is received into the recess.

20. The gas turbine engine of claim 18, wherein the recess is sized to maintain a relief gap circumferentially between the recess and the extension that is received into the recess.

* * * * *